April 28, 1970  D. D. WILEY  3,509,528
WARNING DEVICE FOR A DUAL BRAKE SYSTEM
Filed Aug. 8, 1966

INVENTOR
DARYL D. WILEY
BY
Mueller, Aichele & Rauner
ATTYS.

United States Patent Office 3,509,528
Patented Apr. 28, 1970

3,509,528
WARNING DEVICE FOR A DUAL BRAKE SYSTEM
Daryl D. Wiley, Elmhurst, Ill., assignor to Motorola, Inc., Franklin Park, Ill., a corporation of Illinois
Filed Aug. 8, 1966, Ser. No. 570,848
Int. Cl. B60q *1/00;* B60t *17/22*
U.S. Cl. 340—52        3 Claims

ABSTRACT OF THE DISCLOSURE

An electrical warning apparatus installed in the brake lines of a vehicle employing a dual chambered master pressure cylinder. When the brake is applied, if pressure fails to develop in the brake lines associated with either chamber the warning device is activated.

---

This invention relates to a warning arrangement for an automotive dual brake system indicating failure of either section of the system.

To provide added safety, dual brake systems have been used in automotive vehicles. To provide further safety it is desired to have a warning indication if either one of the sections of the brake system fails. Indicator systems have been proposed which use relays to complete the circuit of an indicator lamp to energize the same. In order to reduce the cost of such systems it is desired to eliminate the relay switch.

Accordingly, it is an object of this invention to provide a new and improved warning system for a dual brake system.

Another object is to simplify and reduce the number of parts in a dual brake system for indicating failure of either one of the systems.

A feature of this invention is the provision of a semiconductor switching device series connected to a warning device, which semiconductor device is rendered conductive when only one system of the dual brake system is operating. The switching device may be a silicon controlled rectifier which holds the warning device operated.

A specific form of the warning system for the dual brake system includes a master cylinder having two parallel operated pressure cylinders for a first and second sections of the brake system. One pressure cylinder is connected through a first pressure line and a first pressure switch to the brakes of the first section, whereas the other pressure cylinder is connected through a second pressure line and a second pressure switch to the brakes of the second section. Each pressure switch provides a movable contact operable between contacts of first and second conditions. The contacts for the first condition are connected to a power supply, whereas the contacts for the second condition are connected to a semiconductor switching device which is series connected through a warning device to ground potential. The movable contacts of the pressure switch are connected to a stop light. The semiconductor switching device is rendered conductive when either of the first and second pressure switches is switched to the first condition as a result of pressure failure in the corresponding pressure line.

In another specific form of the warning system, the contacts for the second condition are connected through a resistor in series with a capacitor to ground potential. The junction between the resistor and capacitor is connected to the control electrode of a silicon controlled rectifier (SCR) which is connected between the A+ voltage source of the ignition system and the warning device.

Figure 1:
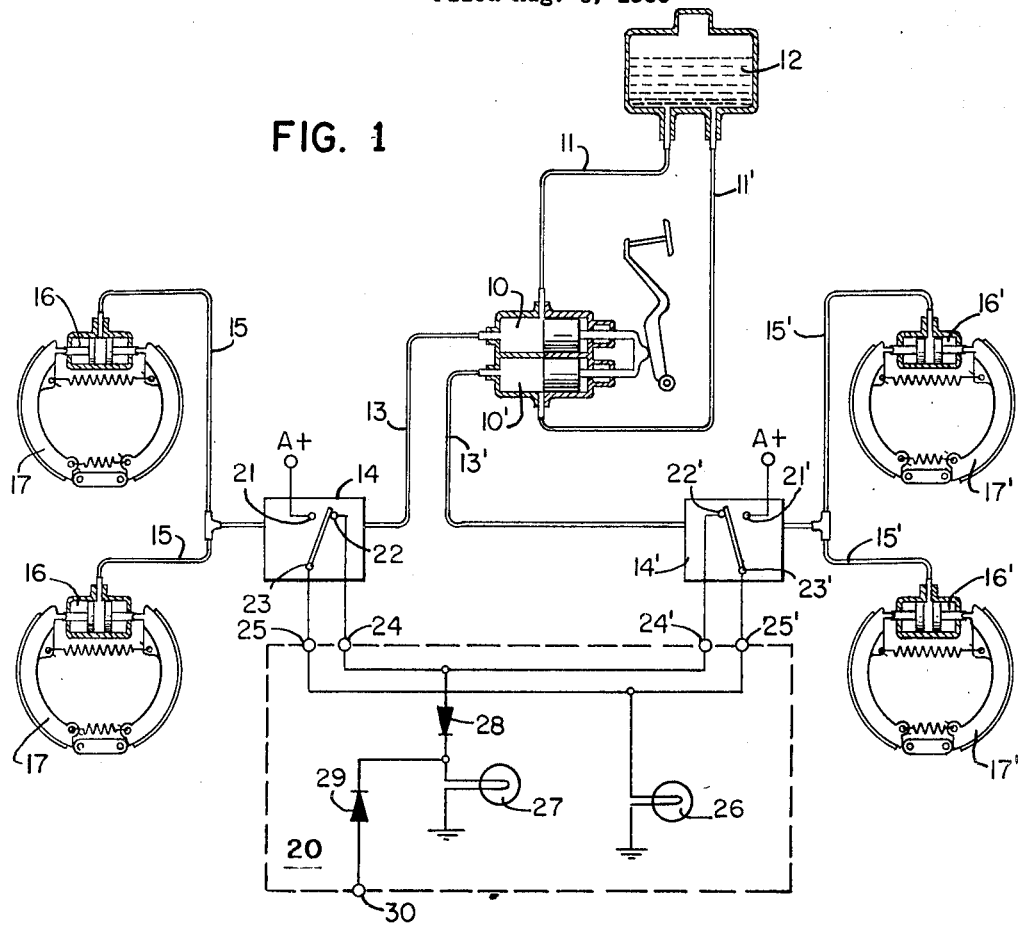
FIG. 1 is a circuit schematic of the warning system utilized for a dual brake system.

Referring now to the drawings, FIG. 1 shows a hydraulic dual brake system for an automobile. Since the two separate sections of the system are identical the corresponding identical parts are indicated by the same reference numbers, with the numbers of the second section being followed by a prime mark. The dual brake system comprises a master cylinder having a first pressure cylinder 10 connected by tube 11 to a container 12 for the brake fluid, and a second pressure cylinder 10' connected by tube 11' to the same container. The cylinders 10 and 10' are further connected through tubes 13 and 13', pressure switches 14 and 14' and tubes 15 and 15' to actuators 16 and 16' which actuate the brake shoes 17 and 17'.

The pressure switches 14 and 14' include movable contacts 23 and 23', first condition contacts 21 and 21' and second condition contacts 22 and 22'. The first condition contacts are connected to the power supply providing a positive voltage A+, whereas the movable contacts are connected to terminals 25 and 25' and the second condition contacts are connected to terminals 24 and 24'.

An indication device 20, including a stop light 26 which is lighted when the brakes are applied, is connected between the terminals 25 and 25' and ground potential. The terminals 24 and 24' are connected through a semiconductor diode 28 in series with a failure warning light 27 to ground potential. The junction of diode 28 and warning light 27 is connected through a diode 29 to terminal 30, which may be connected to the starter solenoid of the automobile, not shown in the drawing.

Considering now the operation of the warning system, assume that when the brakes are operated, a fault occurs in the section of the dual brake system including switch 14. Switch 14 therefore remains unoperated and completes a circuit through the movable contact 23 and the first condition contact 22, whereas switch 14' operates and completes the circuit through the movable contact 23' to the second condition contact 21'. Thus, the positive voltage A+ is applied through contacts 21' and 23' to the stop light 26, and further through contacts 23 and 22 to the diode 28. The positive voltage renders the diode 28 conductive and lights the warning light 27 showing that one of the sections of the brake system is not working.

This warning system operates when either pressure switch 14 and 14' fails to operate as a result of pressure failure of either line, and the other pressure switch does operate, so that the voltage A+ forward biases diode 28 and applies power to the warning light 27.

The warning light is checked when the starter solenoid connected to terminal 30 is activated, as this applies a positive voltage to the warning light 27 through diode 29. The diode 28 isolates the voltage from being applied to the stop light 26 during starter solenoid actuation. Diode 29 isolates the positive voltage through the pressure switch from the starter solenoid during a brake line failure.

Figure 2:
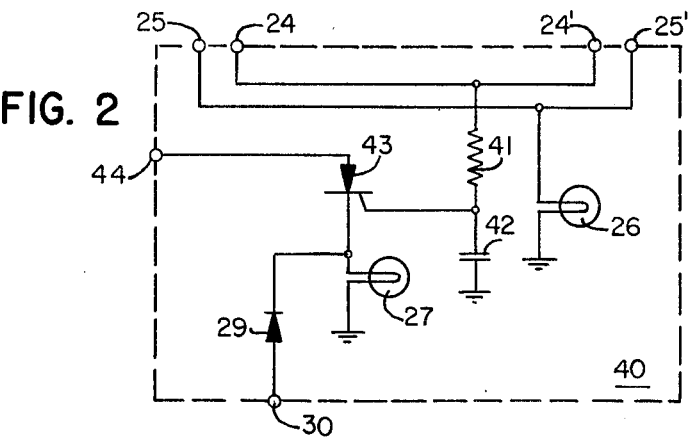
FIG. 2 is another embodiment of the warning system.

Another embodiment of the warning system is shown in FIG. 2. The same parts of the indication device 20 and the indication device 40 are characterized by the same numbers. The indication device 40 is adapted to be connected to the terminals 24, 24', 25, 25' and 30 of FIG. 1. Another terminal 44 is connected to the A+ voltage supply of the ignition system. A stop light 26 is connected to the terminals 25 and 25'. The terminals 24 and 24' are connected through resistor 41 in series with capacitor 42 to ground potential. The junction of resistor 41 and capacitor 42 is connected to the control electrode of the silicon controlled rectifier (SCR) 43, the anode of which is connected to terminal 44 and the cathode through the warning light 27 to ground potential. The diode 29 is also connected to the cathode of the SCR. The terminal 44 is connected to the ignition system which is not shown in the drawing and which applies the A+ voltage to the SCR as long as the engine is operating.

The indication device 40 functions similarly to the device 20 except that the SCR will provide a lock-up feature. If a fault in one pressure line occurs, only the pressure switch which is under pressure will complete the circuit by switching to the first condition position and applying voltage to the stop light 26, whereas the pressure switch which is pressureless will stay in the second condition position and applies the voltage of the stop light circuit through resistor 41 to the SCR 43 to fire the same and light the warning light 27. The SCR will remain on to hold the light 27 energized until the ignition switch is turned off.

The resistor 41 is designed to limit the gate current applied to the SCR 43, and the capacitor 42 prevents line voltage transients from triggering the circuit. The warning light is checked during starting as previously described. In order to isolate the starter solenoid from the warning light voltage during a fault indication, diode 29 is polarized such that it is conductive only when a positive voltage is applied to the solenoid during starting of the engine.

The warning system described indicates when one section of the dual brake system is not operating, so that this section can be repaired and the protection afforded by the dual system is restored.

I claim:

1. Warning apparatus for indicating failure of either section of a dual brake system which has first and second master pressure cylinders, first and second pressure operated brake devices, and first and second pressure lines coupled respectively from the first and second master pressure cylinders to the first and second brake devices for actuating the brake devices, the warning apparatus including in combination, first and second pressure switch means respectively in the first and second pressure lines, each of said pressure switch means having a movable contact operable between first and second fixed contacts, said movable contact of each pressure switch means normally engaging said first contact thereof and being moved into engagement with said second contact when the pressure in the associated line reaches a given magnitude, said first fixed contacts of each said pressure switch means being interconnected, said movable contacts of each said pressure switch means being interconnected, means applying a potential to said second fixed contacts of each said pressure switch means, and a pressure failure warning device and semiconductor switching means connected between said first fixed contacts and a reference potential, whereby said semiconductor switching means is rendered conductive to actuate said warning device when only one of said movable contacts of said first and second pressure switch means is switched to said second fixed contact and said movable contact of the other one of said pressure switch means remains in engagement with said first fixed contact.

2. The warning apparatus according to claim 1 wherein said semiconductor switching means includes a semiconductor diode connected to said first fixed contacts.

3. The warning apparatus according to claim 1 wherein said semiconductor switching means includes a silicon controlled rectifier having cathode, anode and gate electrodes, with said cathode being connected to said warning device, means applying an energizing potential to said anode, and resistor means and capacitor means series connected between said first contacts and the reference potential, said gate electrode being connected to the junction of said resistor means and said capacitor means for rendering said silicon controlled rectifier conductive.

References Cited

UNITED STATES PATENTS

| | | | |
|---|---|---|---|
| 3,011,595 | 12/1961 | Heiss et al. | 340—52 X |
| 3,423,727 | 1/1969 | Adamson | 340—60 X |

JOHN W. CALDWELL, Primary Examiner

H. S. COHEN, Assistant Examiner

U.S. Cl. X.R.

303—84; 340—60